(12) United States Patent
Miller et al.

(10) Patent No.: US 8,927,796 B2
(45) Date of Patent: Jan. 6, 2015

(54) BASE OIL UPGRADING BY CO-FEEDING A KETONE OR BETA-KETO-ESTER FEEDSTOCK

(75) Inventors: Stephan Joseph Miller, San Francisco, CA (US); Sven Ivar Hommeltoft, Pleasant Hill, CA (US); Saleh Ali Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/615,054

(22) Filed: Sep. 13, 2012

(65) Prior Publication Data

US 2014/0073826 A1    Mar. 13, 2014

(51) Int. Cl.
*C10G 3/00* (2006.01)
*C10G 47/00* (2006.01)
*C10M 105/04* (2006.01)

(52) U.S. Cl.
CPC .................................. *C10M 105/04* (2013.01)
USPC ........... 585/240; 585/241; 585/242; 585/256; 585/734; 508/577; 208/106; 208/107; 208/108; 208/49; 208/58; 208/60

(58) Field of Classification Search
USPC .................. 585/240–242, 256, 734; 508/577; 208/106–108, 49, 58, 60
See application file for complete search history.

(56) References Cited

U.S. PATENT DOCUMENTS

| | | | |
|---|---|---|---|
| 3,365,390 A * | 1/1968 | Egan et al. ........................ 208/60 |
| 3,642,610 A * | 2/1972 | Divijak et al. ................... 208/58 |
| 5,135,638 A | 8/1992 | Miller et al. | |
| 5,282,958 A | 2/1994 | Santilli et al. | |
| 7,282,134 B2 | 10/2007 | Abernathy et al. | |
| 7,501,546 B2 | 3/2009 | Koivusalmi et al. | |
| 7,795,484 B2 | 9/2010 | Koivusalmi et al. | |
| 7,850,841 B2 | 12/2010 | Koivusalmi et al. | |
| 7,888,542 B2 | 2/2011 | Koivusalmi et al. | |
| 7,967,973 B2 | 6/2011 | Myllyoja et al. | |
| 7,998,339 B2 | 8/2011 | Myllyoja et al. | |
| 8,048,290 B2 | 11/2011 | Knuuttila et al. | |
| 8,053,614 B2 | 11/2011 | Aalto et al. | |
| 8,143,469 B2 | 3/2012 | Koivusalmi et al. | |
| 2008/0229654 A1 * | 9/2008 | Bradin ............................. 44/308 |
| 2009/0014354 A1 * | 1/2009 | Knuuttila et al. ............... 208/58 |
| 2009/0247799 A1 | 10/2009 | Myllyoja et al. | |
| 2009/0285728 A1 | 11/2009 | Miller | |
| 2011/0105814 A1 | 5/2011 | Koivusalmi et al. | |

OTHER PUBLICATIONS

Bawase, M. A., S D Reve, S V Shete and M R Saraf, Carbon Number Distribution by Gas Chromatography for Identification of Outlying Diesel Sample, AdMet 2012 No. CM 003, p. 1-7, http://www.metrologyindia.org/ebooks1/CM_003.pdf.*
R.K. Sinnott, Coulson & Richardson's Chemical Engineering—Chemical Engineering Design, vol. 6, Fourth Edition, 2005, p. 50.*
Khonsari, M.M., and E.R. Booser, Applied Tribology: Bearing Design and Lubrication, Appendix B, Viscosity Conversions, 2008, p. 555-556.*
U.S. Appl. No. 13/157,921, filed Jun. 10, 2011, Bi-Zeng Zhan et al., "Conversion of Fatty Acids to Base Oils and Transportation Fuels".
U.S. Appl. No. 13/486,097, filed Jun. 1, 2012, "Process for Producing Ketones From Fattyacids".
C.A. Gaertner et al., Catalytic Coupling of Carboxylic Acids by Ketonization as a Processing Step in Biomass Conversion, Journal of Catalysis, 266, (2009), pp. 71-78.
M. Glinski et al., Catalytic Ketonization of Carboxylic Acids Synthesis of Saturated and Unsaturated Ketones, React. Kinet. Catal. Lett., vol. 69, No. 1, pp. 123-128, (2000).
Xiong et al., A Bio-Catalytic Approach to Aliphatic Ketones, Science Reports, 2, 311, pp. 1-7, Mar. 13, 2012.
Vogel's Textbook of Practical Organic Chemistry, Forth edition, Longman New York 1978, pp. 429-433.
Anneken, D. J., Both, S., Christoph, R., Fieg, G., Steinberner, U. and Westfechtel, A., 2006, Fatty Acids. Ullmann's Encyclopedia of Industrial Chemistry, vol. 14, 5th ed., pp. 73-112; VCH: Weinheim, Germany, at p. 79, Fig. 7.
March's Advanced Organic Chemistry: Reactions, Mechanisms, and Structure, Fourth edition, Wiley-Interscience 1992, pp. 491-493.
Database CA [Online]; Chemical Abstracts Service, Columbus, Ohio, US; Kim, Jong Dae et al: ~~synthesis of 4,5-bis(hexanoyloxy)dodecane and its lubricating property~~, retrieved from STN, Database accession No. 1987:69869; & Kicho Kwahak Yongu (Yeungnam Taehakkyo), 5, 129-35 Coden: KKWYDR, 1985.

* cited by examiner

*Primary Examiner* — In Suk Bullock
*Assistant Examiner* — Philip Louie
(74) *Attorney, Agent, or Firm* — Melissa M. Hayworth; Steven H. Roth; Daniel R. Evans

(57) ABSTRACT

This invention discloses a process for making high viscosity index lubricating base oils having a viscosity index of at least 110 by co-feeding a ketone or a beta-keto-ester feedstock with a lubricant oil feedstock directly to a hydrocracking unit to produce a hydrocracked stream. Then at least a portion of the hydrocracked stream is treated under hydroisomerization conditions to produce a high viscosity index lubricating base oil. The process may involve bypassing a hydrotreating or hydrofinishing step, which may result in improved efficiency and economics in producing high viscosity index lubricating base oils.

15 Claims, No Drawings

BASE OIL UPGRADING BY CO-FEEDING A KETONE OR BETA-KETO-ESTER FEEDSTOCK

FIELD OF THE INVENTION

This invention relates to a process for economically producing high viscosity index base oils by co-feeding a lubricant oil feedstock and a ketone made by decarboxylation-coupling of fatty acids or a beta-keto-ester made by Claisen condensation of fatty acid ester together or separately into a hydrocracking unit. The hydrocracked product is dewaxed in an hydroisomerization unit to afford a high viscosity index base oil.

BACKGROUND OF THE INVENTION

The trends with automotive engine design are associated with increased operating temperatures and improved engine efficiency, which ultimately require higher quality lubricants. Automobile manufacturers and government regulators have introduced increasingly more stringent performance requirements for lubricants to comply with the ongoing environmental standards. As such, the specifications for finished lubricants are requiring products having excellent low temperature properties, high oxidation stability, low volatility and high viscosity indexes. Indeed, the increasingly demanding specifications require higher quality base oils that can be produced efficiently and economically.

In this aspect, Group II+ base oil, though not an official American Petroleum Institute (API) designation, is a term used to describe API Group II stocks of higher viscosity index (110-119) and lower volatility than comparable Group II stocks.

However, due to their high viscosity index and low volatility, API Group III base oils have become the base stocks of choice for the next generation of lubricant compositions. This in turn has resulted in greater demand for the supply of Group III base oils. Production of Group III base oils can be difficult and require the use of special high viscosity index gas oils, which can be higher in cost than the gas oils used to make Group II base oils. Additionally, the production of Group III base oils can involve severe hydrocracking of gas oils in order to obtain a viscosity index of at least 120. The severity of the hydrocracking conditions can shorten the life of the catalyst and negatively impact the yield by downgrading potential base oil to lower valued diesel and other light products.

An alternative can include co-feeding a high quality second feedstock with a lubricant oil feedstock directly to a hydrocracking unit in order to boost the viscosity index to Group II+ or Group III base oils. In this aspect, it would be advantageous if the second feedstock were low in cost and had additional benefits, such as a high viscosity index, low pour point and result in reduced environmental waste.

It has been discovered that ketones and beta-keto-esters may be formed from renewable fatty acid sources and then deoxygenated to afford high value base oils. Transforming renewable fatty acids into useful products presents a unique opportunity to address stringent performance requirements for lubricants. As such, there are numerous efforts underway to generate hydrocarbon base oils from renewable biomass. (e.g., Xiong et al., A Bio-Catalytic Approach to Aliphatic Ketones, *Science Reports*, 2, 311, pp. 1-7, Mar. 13, 2012). The preparation of ketones from carboxylic acids is well known and has been used in their preparation from carboxylic acids for many years. (e.g., Vogel's Textbook of Practical Organic Chemistry, Fourth edition, Longman N.Y. 1978, pp. 429- 433). It is also well known that the reactions can be used to convert fatty acids such as stearic acid and other fatty acids of natural origin to ketones in the base oil boiling range. (e.g., U.S. Patent Application Publication No's.: US 2013/0324449 and US 2012/0316093; and U.S. Pat. Nos. 7,850,841, 7,967,973 and 8,048,290). The preparation of beta-keto-esters from esters is well known and has been used in the preparation of beta-keto-esters from the commonly known Claisen condensation for many years. (e.g., March's Advanced Organic Chemistry: Reactions, Mechanisms, and Structure, Fourth edition, Wiley-Interscience 1992, pp. 491-493).

In summary, the process disclosed herein provides several advantages over previously-known techniques for producing Group II+ or Group III base oils. Adding the ketone or beta-keto-ester feedstock directly to the lubricant hydrocracker together with the traditional feedstock used for processing base oils gives a surprisingly large increase in the VI of the total base oil. The hydrocracking catalyst and process can handle higher oxygen levels in the feed, which is in contrast to the sensitivity of the hydroisomerization catalyst to oxygen and thus hydrotreating of the biologically derived feedstock prior to introduction to the lubricant producing hydrocracker will typically not be required. Furthermore, due to the linear carbon chains of the ketone or beta-keto-ester feedstock it may be less likely to crack to light products out of the base oil range.

SUMMARY OF THE INVENTION

In one embodiment, the present invention provides a process for increasing the viscosity index of a base oil, comprising: a) providing a ketone or a beta-keto-ester feedstock from a reaction in a coupling zone with one or more reactants comprising: i) one or more fatty acids which can be the same or different and a decarboxylation-coupling catalyst, or ii) one or more esters of fatty acids which can be the same or different and a base; b) providing a blend by co-feeding the ketone or the beta-keto-ester feedstock of Step a) with a lubricant oil feedstock together or separately into a hydrocracking zone; c) hydrocracking the blend of Step b) in a lubricant hydrocracking zone in the presence of a hydrocracking catalyst and hydrogen under lubricant hydrocracking conditions to produce a hydrocracked stream; and d) dewaxing at least a portion of the hydrocracked stream in a hydroisomerization zone in the presence of a hydroisomerization catalyst and hydrogen under hydroisomerization conditions to produce a base oil.

DETAILED DESCRIPTION OF THE INVENTION

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the coupling zone temperature is in a range from about 20° C. to 75° C. above a condensation point of the fatty acid at a partial pressure of the fatty acid in the coupling zone.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein a partial pressure of the fatty acid in the coupling zone is in a range from about 75 psia to 1 psia.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the pressure and temperature in the coupling zone are chosen in such a way that the fatty acid is in the vapor phase at the reaction condition.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the ketone feedstock is aliphatic having from 20 to 48 carbon atoms and combinations thereof.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the ketone feedstock is aliphatic having 20, 21, 22, 23, 24, 25, 26, 27, 28, 29, 30, 31, 32, 33, 34, 35, 36, 37, 38, 39, 40, 41, 42, 43, 44, 45, 46, 47 or 48 carbon atoms and combinations thereof.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the beta-keto-ester feedstock is aliphatic having from 20 to 60 carbon atoms and combinations thereof.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the beta-keto-ester feedstock is aliphatic having 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 carbon atoms and combinations thereof.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, further comprising flash distillation or partial condensation of the ketone or the beta-keto-ester feedstock of Step a) to separate at least low molecular weight fragments.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, further comprising a deoxygenation of the ketone or the beta-keto-ester feedstock in the hydrocracker zone.

In some embodiments, the present invention provides a process for increasing the viscosity index of a base oil, further comprising distilling the hydrocracked stream of Step c) to separate at least hydrogen, carbon dioxide, and water, from the stream and collecting at least a portion of the distilled stream for use as a middle distillate fuel.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, further comprising separating the portion of the distilled stream into a gasoline boiling point range component, an aviation boiling point range component, and a diesel boiling point range component.

In some embodiments, the hydrocracked stream is dewaxed in a hydroisomerization zone wherein a hydrogen to feed ratio comprises a range from about 500 to 10000 SCF/barrel, 1000 to 5000 SCF/barrel or 2000 to 4000 SCF/barrel.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, further comprising hydrogenation the ketone or the beta-keto-ester feedstock of Step a) in a lubricant hydrogenation zone in the presence of a hydrogenation catalyst and hydrogen under hydrogenation conditions.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, further comprising feeding the base oil from the hydroisomerization zone directly to the hydrotreating zone.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, further comprising recycling unreacted fatty acids and esters of fatty acids by distilling the ketone or the beta-keto-ester feedstock of Step a) in a distillation zone and feeding unreacted fatty acids or esters of fatty acids back to the coupling zone.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the base oil of Step d) comprises a range from about 5 to 40 wt. %, 10 to 50 wt. %, 15 to 50 wt. %, 20 to 50 wt. %, 25 to 50 wt. % or 50 to 75 wt. % of the ketone or the beta-keto-ester feedstock based on the total weight of the base oil.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the fatty acid is selected from caproic acid, caprylic acid, capric acid, lauric acid, myristic acid, palmitic acid, stearic acid, arachidic acid, palmitolic acid, oleic acid, palm kernel oil acids, palm oil acids, coconut oil acids, soy bean oil acids, rape seed oil fatty acids, poultry fat derived fatty acids, beef tallow derived fatty acids and combinations thereof.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein a transesterification of vegetable oils and animal fats is done in the presence of sodium or potassium methoxide or ethoxide to produce the methyl or ethyl esters of the fatty acids.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the lubricant oil feedstock is selected from vacuum gas oil, crude oil, virgin petroleum fractions, recycle petroleum fractions, shale oil, liquefied coal, tar sand oil, solvent-deasphalted petroleum residue, coal tar distillates and combinations thereof.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein lubricant oil feedstock is a vacuum gas oil boiling at a temperature of at least about 232° C. or in a temperature range from about 288° C. to 593° C.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein at least about 50 wt. % of the lubricant oil feedstock boils at a temperature of at least about 288° C.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein the base oil of Step d) has a kinematic viscosity at 100° C. in a range from about 3 to 7 mm$^2$/s.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein less than about 5 wt. % or 10 wt. % of the ketone or the beta-ketoester feedstock boils at a temperature of at least about 538° C.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein the base oil of Step d) has a viscosity index greater than at least 110 or 120.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein the base oil has a viscosity index in a range from about 121 to 160.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein the base oil of Step d) is a Group II+ or a Group III base oil.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprising stabilizing the base oil of Step d) in a hydrofinishing zone in the presence of a hydrofinishing catalyst and hydrogen under hydrofinishing conditions.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprising feeding the base oil from the hydroisomerization zone directly to the hydrofinishing zone.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprising a process for hydrocracking the blend of Step a) to afford a heavy wax concentrate in the uncracked 343° C.+ bottoms fraction.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein the heavy wax comprises at least about 10 wt. %, 20 wt. %, 30 wt. %, 40 wt. %, 50 wt. %, 60 wt. %, 70 wt. %, 80 wt. % or 90 wt. % n-paraffins.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein the heavy wax comprises less than about 5 wt. %, 3 wt. %, 1 wt. % or 0.5 wt. % aromatics.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprising a step of distilling.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprising a step of flash distillation or partial condensation.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, wherein the fatty acids or esters of fatty acids are derived from biomass.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprises blending the base oil of Step d) with one or more additives selected from the group consisting of antioxidants, detergents, anti-wear agents, metal deactivators, corrosion inhibitors, rust inhibitors, friction modifiers, anti-foaming agents, viscosity index improvers, demulsifying agents, emulsifying agents, tackifiers, complexing agents, extreme pressure additives, pour point depressants, and combinations thereof to make a finished lubricant.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprises blending a base oil from the hydrofinishing zone with one or more additives selected from the group consisting of antioxidants, detergents, anti-wear agents, metal deactivators, corrosion inhibitors, rust inhibitors, friction modifiers, anti-foaming agents, viscosity index improvers, demulsifying agents, emulsifying agents, tackifiers, complexing agents, extreme pressure additives, pour point depressants, and combinations thereof to make a finished lubricant.

In some embodiments, the present invention provides a process for increasing the viscosity index of a base oil by providing a blend by co-feeding the ketone or the beta-ketoester feedstock of Step a) with a lubricant oil feedstock together or separately into a hydrocracking zone, further comprises blending a base oil from the hydrofinishing zone into engine oils, greases, heavy duty motor oils, passenger car motor oils, transmission and torque fluids, natural gas engine oils, marine lubricants, railroad lubricants, aviation lubricants, food processing lubricants, paper and forest products, metalworking fluids, gear lubricants, compressor lubricants, turbine oils, hydraulic oils, heat transfer oils, barrier fluids, and other industrial products.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the base oil of Step d) can be blended into engine oils, greases, heavy duty motor oils, passenger car motor oils, transmission and torque fluids, natural gas engine oils, marine lubricants, railroad lubricants, aviation lubricants, food processing lubricants, paper and forest products, metalworking fluids, gear lubricants, compressor lubricants, turbine oils, hydraulic oils, heat transfer oils, barrier fluids, and other industrial products.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, further comprises blending a base oil from the hydrofinishing zone into a multigrade engine oil. Examples of multigrade engine oils that can be blended with the base oil are 5W-XX, 10W-XX, and 15W-XX, wherein XX is selected from the group consisting of 20, 30, 40, 50, and 60.

In some embodiments, the present invention provides a process for increasing the viscosity index of a base oil by providing a blend by co-feeding the ketone or the beta-keto-ester feedstock of Step a) with a lubricant oil feedstock together or separately into a hydrocracking zone, wherein the base oil of Step d) can be blended into a multigrade engine oil. Examples of multigrade engine oils that can be blended with the base oil are 5W-XX, 10W-XX, and 15W-XX, wherein XX is selected from the group consisting of 20, 30, 40, 50, and 60.

I. Fatty Acid and Ester of Fatty Acid Feedstock

The feedstock comprises at least one fatty acid or a mixture of fatty acids. The feedstock is typically derived from a triglyceride-containing biomass source such as plant, vegetable, animal and fish oils and fats. It will be further appreciated that some such sources are more economical and more amenable to regional cultivation, and also that those sources from which food is not derived may be attractive alternatives. The biomass source can be treated using any pre-treatment or purification method well known in the art to obtain fatty acids useful as the feedstock, such as hydrolysis. Those of skill in the art will recognize that the types and lengths of the fatty acids are dependent upon the biomass source from which they are derived.

Furthermore, the fatty acid feedstock is derived from other non-biomass sources. Such alternatively-derived fatty acids could be mixed with the biomass-derived fatty acid prior to ketonization. Such mixing could serve to alleviate logistical and/or supply related issues involving biomass.

The fatty acid feedstock can be a bio-derived fatty acid formed by hydrolysis of one or more triglyceride-containing vegetable oils such as, but not limited to coconut oil, corn oil, linseed oil, olive oil, palm oil, palm kernel oil, rapeseed oil, safflower oil, soybean oil, sunflower oil and the like. Moreover, additional sources of triglycerides, which can be hydrolyzed to yield fatty acids, include, but are not limited to, algae, animal tallow and zooplankton.

The carbon lengths of suitable of saturated fatty acids such as, but not limited to caproic acid ($C_6$), caprylic acid ($C_8$), capric acid ($C_{10}$), lauric acid ($C_{12}$), myristic acid ($C_{14}$), palmitic acid ($C_{16}$), stearic acid ($C_{18}$) and arachidic acid ($C_{20}$). The carbon lengths of suitable of unsaturated fatty acids includes, but not limited to $C_8$-$C_{22}$ fatty acids, and combinations thereof. Examples of unsaturated acids are palmitoleic acid, oleic acid and Linoleic acid.

Also mixtures from various natural resources are suitable feedstocks. Examples of these are palm kernel oil acids (a mixture of $C_8$ to $C_{22}$ fatty acids, primarily lauric acid and myristic acid), coconut oil acid (a mixture of $C_8$ to $C_{22}$ fatty acids, primarily lauric acid and myristic acid), palm oil acids, soy bean oil acids, rape seed oil fatty acids, poultry fat derived fatty acids, beef tallow derived fatty acids and combinations thereof.

In addition, the above-mentioned hydrolyzed triglyceride sources contain mixtures of saturated fatty acids, mono-unsaturated fatty acids and polyunsaturated fatty acids, one or more techniques may be employed to isolate, concentrate or otherwise separate the desired fatty acids from the other fatty acids in the mixture (e.g., U.S. Patent Application Publication No.: 2009/0285728).

Moreover, transesterification of vegetable oils and animal fats is typically done in the presence of sodium or potassium methoxide or ethoxide to produce the corresponding methyl or ethyl esters of the liberated fatty acids. In this aspect, the methyl or ethyl esters of the fatty acids are ideal feedstocks for the Claisen condensation reaction as described below.

II. Lubricant Oil Feedstock

The process of the invention may employ a wide variety of lubricant oil feed stocks from many different sources, including, but not limited to crude oil, virgin petroleum fractions, recycle petroleum fractions, shale oil, liquefied coal, tar sand oil, petroleum distillates, solvent-deasphalted petroleum residua, coal tar distillates and combinations thereof. Other feedstocks that can be used include synthetic feedstock such as synthetic paraffins derived from normal alphaolefins and those derived from Fischer-Tropsch processes. Other suitable feedstocks include those heavy distillates normally defined as heavy straight-run gas oils and heavy cracked cycle oils, as well as conventional fluid catalytic cracking feedstock and portions thereof. In general, the feedstock can be any carbon-containing feedstock susceptible to hydroprocessing catalytic reactions, particularly hydrocracking. The sulfur, nitrogen and saturate contents of these feedstocks will vary depending on a number of factors.

In certain instances, a suitable lubricant oil feedstock is a vacuum gas oil boiling at a temperature of at least about 232° C. and more typically within a temperature range from about 288° C. to 593° C. Moreover, at least 50 wt. % of the lubricant oil feedstock may boil at a temperature of at least about 288° C.

III. Heavy Wax

Heavy wax is a valuable material for the production of high viscosity lubricating base oils. The process of the invention provides for hydrocracking the ketone or the beta-keto-ester feedstock to afford a heavy wax concentrate in the uncracked 343° C.+ bottoms fraction. The heavy wax is hydrocarbon mixtures with melting points significantly above ambient temperature. The heavy wax may contain paraffins with a carbon range from about $C_{20}$-$C_{60}$. The heavy wax exhibits a boiling point in a range from about 371° C. to 649° C. In this aspect, the heavy wax comprises at least 10 wt. % n-paraffins (e.g., at least 20 wt. %, 30 wt. %, 40 wt. %, at least 50 wt. %, at least 60 wt. %, at least 70 wt. %, at least 80 wt. % or at least 90 wt. % n-paraffins).

If present, oxygenates will generally make up less than 2 wt. % of the heavy wax (e.g., less than 1 wt. %, less than 0.5 wt. %, or less than 0.1 wt. % of the heavy wax).

IV. Decarboxylation-Coupling

Ketones may be prepared by a decarboxylation-coupling (i.e., ketonization) of fatty acids (see Scheme 1). The ketone is then treated in the hydrocracker to deoxygenate and yield a product encompassing the backbones of the two original fatty acids coupled to afford one new dimer molecule. Without being bound by any particular theory, a ketone is formed in the decarboxylation-coupling process from two fatty acid compounds. Carbon dioxide and water are produced as by-products. The following illustrates this proposed reaction scheme:

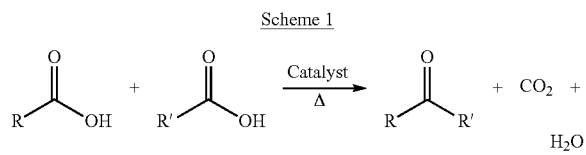

Scheme 1

Wherein, R and R' are saturated or unsaturated aliphatic groups and can be the same or different.

V. Claisen Condensation

Beta-keto-esters may be prepared by the Claisen condensation reaction of the esters of fatty acids. Without being bound by any particular theory, a beta-keto-ester is formed in the Claisen condensation and takes place is in the presence of a base. In the reaction, an alpha proton to the carbonyl of the ester group is abstracted by a base to form an anion which adds to the carbonyl of a second ester molecule (same ester or different ester) making alkoxylate anion of the two linked esters that collapses to make beta-keto-ester (see Scheme 2). The beta-keto-ester is then treated in the hydrocracker to deoxygenate and yield a methyl branched product encompassing the backbones of the two original esters condensed into one new molecule. The reaction applies to all types of esters and to the esters of both saturated and unsaturated fatty acids. The following illustrates this proposed reaction scheme:

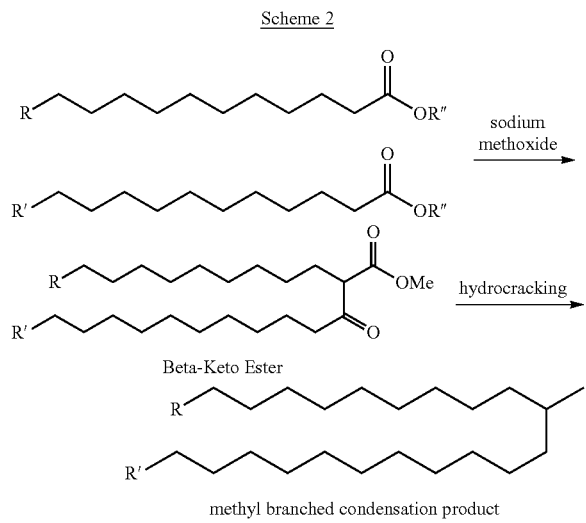

Scheme 2

Beta-Keto Ester methyl branched condensation product

Wherein, R and R' are saturated or unsaturated aliphatic groups and can be the same or different and R" are each independently methyl, ethyl or t-butyl.

VI. Process Conditions

Suitable decarboxylation-coupling conditions may include passing the ester of fatty acid containing feedstock stream over a solid catalyst capable of catalyzing the coupling reaction such as for instance alumina, at a temperature in a range from about 300-500° C. and a pressure in a range from about 0.01-100 psia. In certain instances, the pressure and temperature are selected to ensure that the fatty acid feedstock is in the vapor phase at the reaction conditions employed. In this aspect, a commonly owned U.S. patent application Ser. No. 13/486,097 is incorporated herein by reference in its entirety.

Suitable Claisen condensation conditions may include contacting the ester of fatty acid reactant with a strong base in a suitable solvent capable of dissolving both the ester of fatty acid and the base. The reaction will typically be performed at a temperature in a range from −78 to 150° C. and under a pressure that is sufficient to keep solvent and reactants in a liquid phase. The strong base can be sodium methoxide or ethoxide or lithium diisopropylamide or another strong base of comparable or higher base strength. A suitable solvent may for instance be an alcohol such as methanol or an aprotic polar solvent such a THF. Furthermore, the solvent system employed for the Claisen condensation may be a mixture of solvents.

VII. Distilling

The step of distilling employs a distillation column to separate the ketones or beta-keto-esters derived by the above-described processes from by-products (i.e., oligomeric or polymeric species and low molecular weight "fragments" from the fatty acid chains). Moreover, the step of distilling preferably employs flash distillation or partial condensation techniques to remove by-products including at least low molecular weight "fragments".

In addition, there may be a distillation step following the hydroisomerization step to separate base oil, diesel, jet fuel, naphtha and $C_3$-$C_4$.

Those of skill in the art will recognize that there is some flexibility in characterizing the high and low boiling fractions, and that the products may be obtained from "cuts" at various temperature ranges.

VIII. Blends

The lubricant oil feedstock and the ketone or beta-keto-ester feedstock are blended by means well known in the art, including, heating the lubricant oil feedstock or the ketone or beta-keto-ester feedstock or dissolving the ketone or beta-keto-ester feedstock in a solvent prior to blending. The ketone or beta-keto-ester feedstock can be added to the lubricant oil feedstock before the blend enters the hydrocracker. Alternatively, the ketone or beta-keto-ester feedstock and the lubricant oil feedstock can be passed to the hydrocracker in separate streams to form a blend.

Typical blends comprise from 10 to 90 wt. % of the ketone or beta-keto-ester feedstock and from 90 to 10 wt. % of the lubricant oil feedstock, based on the total weight of the blend. Higher percentages in the blend of the ketone or beta-keto-ester feedstock can produce higher viscosity index base oils.

It is usually desirable to maintain as low a cloud point as possible for the lubricating base oil. If the ketone or beta-keto-ester feedstock in the blend has too much ketone or beta-keto-ester boiling above 538° C. then the base oil product after hydroisomerization dewaxing will have a high cloud point, which is difficult to reduce without extra conversion. Therefore, it may be advantageous if less than 10 wt. % of the ketone or beta-keto-ester feedstock exhibits a boiling point above 538° C.

IX. Hydrogenation

The conditions of hydrogenation are well known in the industry and include temperatures above ambient and pressures greater than atmospheric. Preferable conditions for hydrogenation include a temperature between 149 and 427° C., most preferably between 204 and 316° C., a pressure between 50 and 2000 psig, most preferably between 100 and 500 psig, a liquid hourly space velocity (LHSV) between 0.2 and 10 hr$^{-1}$, most preferably between 1.0 and 3.0 hr$^{-1}$, and a gas rate between 500 and 10,000 SCFB, most preferably between 1000 and 5000 SCFB.

The catalysts used for hydrogenation are those typically used in hydrotreating, but non-sulfided catalysts containing Pt and/or Pd are preferred, and it is preferred to disperse the Pt and/or Pd on a support, such as alumina, silica, silica-alumina, or carbon. The preferred support is silica-alumina.

X. Hydrocracking

Hydrocracking is generally accomplished by contacting a feedstock in a hydrocracking reactor or reaction zone, whereby the feedstock may be treated with a suitable hydrocracking catalyst under conditions of elevated temperature and pressure. Hydrocracking reactions reduce the overall molecular weight of the heavy feedstock to yield upgraded products including transportation fuels (e.g., diesel fuel, kerosene and naphtha). These upgraded products that are converted in the hydrocracking reaction zone are typically separated from the total hydrocracker effluent as lower boiling fractions, using one or more separation and/or distillation operations. A remaining higher boiling fraction, containing heavy waxy products (i.e., "heavy hydrocarbon intermediate" or a "heavy waxy oil") suitable for upgrading to lubricating base oils by hydroisomerization to improve its cold flow properties is typically isolated in the fractionators. The heavy waxy oil has a boiling range of approximately 343° C. to 704° C.

The temperature in the hydrocracking zone is in a range from about 260° C. to 482° C., 316° C. to 427° C., or more often from 343° C. to 399° C. A total pressure above 1000 psig (6.89 MPa) is used in the hydrocracking zone. For example, the total pressure can be above 1500 psig (10.34 MPa), or above 2000 psig (13.79 MPa). Although greater maximum pressures have been reported in the literature and may be operable, the maximum practical total pressure generally will not exceed 3000 psig (20.68 MPa). Therefore, more severe hydrocracking conditions such as higher temperature or pressure will result in producing an original base oil product with a higher viscosity index.

The LHSV generally falls within the range of from 0.1 to 50 h$^-$, 0.2 to 10 h$^-$, or more often from 0.5 to 5 h$^{-1}$. The supply of hydrogen (both make-up and recycle) is preferably in excess of the stoichiometric amount needed to crack the target molecules and generally falls within the range of from 500 to 10000 standard cubic feet (SCF)/barrel, typically from 1000 to 5000 SCF/barrel. Note that a feed rate of 10000 SCF/barrel is equivalent to 1781 L H$_2$/L feed. In general, hydrocracking conditions are sufficient to convert the ketone or a beta-ketoester to hydrocarbon.

The catalysts used in the hydrocracking zone are composed of natural and synthetic materials having hydrogenation and dehydrogenation activity and cracking activity. These catalysts are well known in the art and are pre-selected to crack the target molecules and produce the desired product slate. Exemplary commercial cracking catalysts generally contain a support consisting of alumina, silica, silica-alumina composites, silica-alumina-zirconia composites, silica-alumina-titania composites, acid treated clays or crystalline aluminosilicate zeolitic molecular sieve (e.g., zeolite A, faujasite-Y and zeolite beta), and combinations thereof. The hydrogenation/dehydrogenation components generally consist of a metal or metal compound of Group VIII or Group VIB of the Periodic Table of the Elements. Metals and their compounds such as, for example, Co, Ni, Mo, W, Pt or Pd, and combinations thereof are known hydrogenation components of hydrocracking catalysts.

XI. Hydroisomerization Dewaxing

Heavy intermediate products are characterized by high pour points and high cloud points. In order to prepare commercially useful lubricating base oils from heavy intermediate products, the pour point and cloud point must be lowered without compromising the desired viscosity characteristics. Hydroisomerization dewaxing is intended to improve the cold flow properties of the heavy intermediate products by the selective addition of branching into the molecular structure. Hydroisomerization dewaxing ideally will achieve high conversion levels of the waxy oil to non-waxy iso-paraffins while at the same time minimizing cracking Hydroisomerization dewaxing is achieved by contacting a feedstock with a hydroisomerization dewaxing catalyst in a hydroisomerization zone under hydroisomerization dewaxing conditions. The hydroisomerization catalyst preferably comprises a shape selective intermediate pore size molecular sieve, a noble metal hydrogenation component, and at least a refractory oxide support. The shape selective intermediate pore size molecular sieve is preferably selected from the group consisting of SAPO-11, SAPO-31, SAPO-41, SM-3, SM-7, ZSM-22, ZSM-23, ZSM-35, ZSM-48, ZSM-57, SSZ-32 or ferrierite, and combinations thereof. Moreover, SAPO-11, SM-3, SM-7, SSZ-32 or ZSM-23, and combinations thereof are often used. The noble metal hydrogenation component can be Pt or Pd, and combinations thereof.

The hydroisomerization dewaxing conditions depend on several factors including the following: the type of feedstock employed; the hydroisomerization dewaxing catalyst utilized; whether or not the catalyst comprises sulfide; the desired yield; and the desired properties of the product. For instance, the hydroisomerization dewaxing conditions useful in the current invention could include the following: a temperature in a range from about 260° C. to 413° C.; a total pressure in a range from about 15 to 3000 psig (0.10 to 20.68 MPa); a LHSV in a range from about 0.25 to 20 h$^{-1}$; and a hydrogen to feed ratio in a range from about 200 to 30000 SCF/barrel. Moreover, the hydrogen to feed ratio can be in a range from about 500 to 10000 SCF/barrel, 1000 to 5000 SCF/barrel or 2000 to 4000 SCF/barrel. Typically, hydrogen will be separated from the product and recycled to the hydroisomerization zone.

Additional details of suitable hydroisomerization dewaxing processes are described in U.S. Pat. Nos. 5,135,638, 5,282,958 and 7,282,134, which are incorporated herein in their entirety.

XII. Hydrofinishing

Hydrofinishing may be used as a step following hydroisomerization in the process of this invention to make base oils with improved properties. This step is intended to improve the oxidation stability, UV stability and appearance of the product by removing traces of olefins and color contaminates. A general description of hydrofinishing may be found in U.S. Pat. Nos. 3,852,207 and 4,673,487, which are incorporated herein in their entirety. Furthermore, the isomerized product from the hydroisomerization reactor can pass directly to the hydrofinishing reactor.

As used in this disclosure, the term UV stability refers to the stability of the lubricating base oil when exposed to ultraviolet light and oxygen. Instability is indicated when the lubricating base oil forms a visible precipitate or darker color upon exposure to ultraviolet light and air which results in a cloudiness or floc in the product. In certain instances, the lubricating base oils prepared by hydrocracking followed by hydroisomerization may require UV stabilization before they are suitable for use in the manufacture of commercial lubricating oils.

XIII. Lubricating Base Oil Product

The lubricating base oil prepared according to the process described herein has a kinematic viscosity at 100° C. of at least 3 mm$^2$/s. Typically, the kinematic viscosity at 100° C. is 8 mm$^2$/s or less (e.g., from 3 mm$^2$/s to 7 mm$^2$/s). The lubricating base oil has a pour point of −5° C. or below (e.g., −10° C. or below, or −15° C. or below). The VI is usually at least 110 (e.g., at least 115, at least 119 or at least 120). In certain instances, the lubricating base oil has a kinematic viscosity at 100° C. in a range from about 3 mm$^2$/s to 7 mm$^2$/s, a pour point of −15° C. or less, and a VI of at least 110. The cloud point of the lubricating base oil is usually 0° C. or below.

The properties of the lubricating base oils prepared using the process described herein are achieved by blending the lubricant oil feedstock with the minimum amount of the heavy wax necessary to meet the desired specifications for the product. Moreover, the lubricating base oil is at least a Group II+ or Group III base oil.

One feature of the base oil is that it can be blended into a wide variety of high quality finished lubricants by blending the base oil with at least one additive selected from the group consisting of antioxidants, detergents, anti-wear agents, metal deactivators, corrosion inhibitors, rust inhibitors, friction modifiers, anti-foaming agents, viscosity index improvers, demulsifying agents, emulsifying agents, tackifiers, complexing agents, extreme pressure additives, pour point depressants, and combinations thereof; wherein selection of the at least one additive is directed largely by the end-use of the finished lubricant being made, wherein said finished lubricant can be of a type selected from the group consisting of engine oils, greases, heavy duty motor oils, passenger car motor oils, transmission and torque fluids, natural gas engine oils, marine lubricants, railroad lubricants, aviation lubricants, food processing lubricants, paper and forest products, metalworking fluids, gear lubricants, compressor lubricants, turbine oils, hydraulic oils, heat transfer oils, barrier fluids, and other industrial products.

The following phrases and terms will be used throughout the specification and will have the following meanings unless otherwise indicated.

The term "Heavy Wax" refers to a lubricating oil boiling range material (343° C.+ boiling point) which originates from or is produced at some stage by a process in which a ketone or a beta-keto-ester feedstocks are deoxygenated in the hydrocracker to afford a waxy aliphatic product.

The phrase "Group I Base Oil" contain less than 90 percent saturates and/or greater than 0.03 percent sulfur and have a viscosity index greater than or equal to 80 and less than 120 using the ASTM methods specified in Table E-1 of American Petroleum Institute Publication 1509.

The term "Group II Base Oil" refers to a base oil which contains greater than or equal to 90% saturates and less than or equal to 0.03% sulfur and has a viscosity index greater than or equal to 80 and less than 120 using the ASTM methods specified in Table E-1 of American Petroleum Institute Publication 1509.

The term "Group II+ Base Oil" refers to a Group II base oil having a viscosity index greater than or equal to 110 and less than 120. The term "Group III Base Oil" refers to a base oil which contains greater than or equal to 90% saturates and less than or equal to 0.03% sulfur and has a viscosity index greater than or equal to 120 using the ASTM methods specified in Table E-1 of American Petroleum Institute Publication 1509.

The term "Hydrotreating" refers to a catalytic process, usually carried out in the presence of free hydrogen, in which the primary purpose when used to process hydrocarbon feedstocks is the removal of various metal impurities (e.g., arsenic), heteroatoms (e.g., sulfur, nitrogen and oxygen), and aromatics from the feedstock. Generally, in hydrotreating operations cracking of the hydrocarbon molecules (i.e., breaking the larger hydrocarbon molecules into smaller hydrocarbon molecules) is minimized. For the purpose of this discussion, the term hydrotreating refers to a hydroprocessing operation in which the conversion is 20% or less, where the extent of "conversion" relates to the percentage of the feedstock boiling above a reference temperature (e.g., 371° C.), which is converted to products boiling below the reference temperature.

The term "Hydrocracking" refers to a catalytic process, usually carried out in the presence of free hydrogen, whereby the cracking of the larger hydrocarbon molecules into smaller hydrocarbon molecules is the primary purpose of the operation. In contrast to hydrotreating, the conversion rate for hydrocracking for the purpose of this disclosure is defined as greater than 20%.

The term "Hydrogenation" refers to a catalytic process, which is carried out in the presence of free hydrogen, whereby hydrogen is added to a molecule at the site of unsaturation with respect to hydrogen.

The term "Aromatics" means an unsaturated, cyclic and planar hydrocarbon group with an uninterrupted cloud of electrons containing an odd number of pairs of it electrons. Any molecule that contains such a group is considered aromatic.

The term "Oxygenates" means a hydrocarbon containing oxygen (i.e., an oxygenated hydrocarbon). Oxygenates may include alcohols, ethers, carboxylic acids, esters, beta-ketoesters, ketones and aldehydes, and the like.

When used herein, the Periodic Table of the Elements refers to the version published by CRC Press in the *CRC Handbook of Chemistry and Physics,* 88th Edition (2007-2008). The names for groups of the elements in the Periodic Table are given here in the Chemical Abstracts Service (CAS) notation.

The prefix "Bio" refers to an association with a renewable resource of biological origin.

The phrase "Decarboxylation-Coupling" or "Ketonization" refers to a chemical reaction in which two molecules, each having a carboxylic acid functional group, combine to form one single molecule having a ketone functional group, with concurrent loss of carbon dioxide and water.

The phrase "Coupling Zone" refers to a chemical reactor or apparatus suitable for Decarboxylation-coupling, ketonization or Claisen Condensation reactions.

The term "Coupling" refers to a chemical reaction formed by two chemical subunits. For example, subunit A can couple to form $A_2$ and subunit A can couple with subunit B to form AB.

The term "Base Oil" refers to a hydrocarbon fluid to which other oils or substances are added to produce a lubricant.

The term "Lubricant," refers to substances (usually a fluid under operating conditions) introduced between two moving surfaces so to reduce the friction and wear between them. Base oils used as motor oils are generally classified by the American Petroleum Institute as being mineral oils (Group I, II, and III) or synthetic oils (Group IV and V). (See American Petroleum Institute (API) Publication Number 1509).

The term "Viscosity Index" (VI) is an empirical, unit-less number indicating the effect of temperature change on the kinematic viscosity of the oil. A higher viscosity index indicates a smaller decrease in kinematic viscosity with increasing temperature of the lubricant. Viscosity index is measured according to ASTM D 2270-10.

The term "Pour Point" is a measurement of the temperature at which a sample will begin to flow under certain carefully controlled conditions, which can be determined as described in ASTM D 5950-02 (reapproved 2007).

The term "Portion" refers to a quantity within a larger thing, a part of a whole or a part of a quantity. For example, a portion of a hydrocracked stream may be 1 to 99% of the total quantity of the hydrocracked stream.

The term "Cloud Point" represents the temperature at which a fluid begins to phase separate due to crystal formation, which can be determined as described in ASTM D 5771-10.

The term "Fatty Acid" refers to an aliphatic monocarboxylic acid having from 10 to 24 carbon atoms (e.g., from 12 to 22 carbon atoms, or from 14 to 18 carbon atoms). The term "aliphatic" means a straight (i.e., un-branched) or branched, substituted or un-substituted hydrocarbon chain that is completely saturated or that contains one or more units of unsaturation.

The term "Ketone" refers to a molecule containing a carbonyl functional group bridging two groups of atoms. Preferably, the ketone is aliphatic having from 20 to 48 carbon atoms or mixtures thereof. The term "aliphatic" means a straight (i.e., un-branched) or branched, substituted or un-substituted hydrocarbon chain that is completely saturated or that contains one or more units of unsaturation.

The term "Beta-Keto-Ester" refers to a molecule in containing a ketone on the β-carbon of an ester. Preferably, the beta-keto-ester is aliphatic having from 20 to 52 carbon atoms or mixtures thereof. The term "Aliphatic" means a straight (i.e., un-branched) or branched, substituted or un-substituted hydrocarbon chain that is completely saturated or that contains one or more units of unsaturation.

The term "Fatty Acid Conversion" refers to the amount of fatty acid in the feedstock that is converted to a compound other than fatty acid. Conversion is expressed as a mole percentage based on fatty acid in the feedstock. The conversion of fatty acid (FA) can be calculated from composition of feedstock and effluent streams using compositional data from analytical methods such as gas chromatography (GC) data using the following equation:

$$FA\ conv\cdot(\%) = 100 * [(mmol\ FA_{(feed)} - mmol\ FA_{(effluent)}) / mmol\ FA_{(feed)}]$$

The term "Selectivity" refers to a mole percent based on converted fatty acid. It should be understood that each compound converted from fatty acid has an independent selectivity and that selectivity is independent from conversion. For example, if 50 mole % of the converted fatty acid is converted to ketone, the ketone selectivity is 50%. The conversion of fatty acid in the feed is at least 50%, (e.g., at least 60%, at least 70%, at least 80%, at least 90% or at least 95%).

The term "Condensation Point" refers to a point in terms of temperature and pressure where a change occurs in the physical state of matter from the gaseous phase to the liquid phase.

The term "Partial Pressure" refers to (Dalton's Law of Partial Pressures, or Dalton's Law) the total pressure of a gas in a container being the sum of the partial pressures of the individual gases in the container.

The term "LHSV" refers to (liquid hourly space velocity)= (volume of liquid feedstock at 60° F./hr)/volume of catalyst).

The term "Transesterification" refers to the conversion animal and plant fats and oils which are composed of triglycerides (i.e., esters containing three free fatty acids and the trihydric alcohol, glycerol) by the process of exchanging the organic group R" of an ester with the organic group R' of an alcohol. (see Scheme 3) These reactions are often catalyzed by the addition of an acid or base catalyst.

Scheme 3

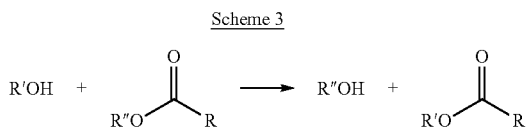

The term "$C_n$" where "n" is an integer, describes a hydrocarbon molecule or fragment (e.g., an alkyl group) wherein "n" denotes the number of carbon atoms in the fragment or molecule.

The term "Carbon Number" is used herein in a manner analogous to that of "$C_n$". A difference, however, is that carbon number refers to the total number of carbon atoms in a molecule (or molecular fragment) regardless of whether or not it is purely hydrocarbon in nature. Linoleic acid, for example, has a carbon number of 18.

The term "Centistoke," abbreviated "cSt," is a unit for kinematic viscosity of a fluid (e.g., a lubricant), wherein 1 centistoke equals 1 millimeter squared per second (1 cSt=1 $mm^2/s$). See, e.g., ASTM Standard Guide and Test Method D 2270-04. Herein, the units cSt and $mm^2/s$ are used interchangeably.

Unless otherwise indicated herein, scientific and technical terms used in connection with the present invention shall have the meanings that are commonly understood by those of ordinary skill in the art. Further, unless otherwise required by context, singular terms shall include pluralities and plural terms shall include the singular. More specifically, as used in this specification and the appended claims, the singular forms "a", "an" and "the" include plural referents unless the context clearly dictates otherwise. Thus, for example, reference to "a fatty acid" includes a plurality of fatty acids, and the like. In addition, ranges provided in the specification and appended claims include both end points and all points between the end points. Therefore, a range of 2.0 to 3.0 includes 2.0, 3.0 and all points between 2.0 and 3.0. Furthermore, all numbers expressing quantities, percentages or proportions, and other numerical values used in the specification and claims, are to be understood as being modified in all instances by the term "about". As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

EXAMPLES

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

Twenty-five wt. % of stearic acid diluted in n-dodecane passing through a fix bed reactor, containing aluminum oxide, was condensed to form $C_{35}$ ketone dimer with long straight chains. Reaction conditions includes a temperature of 730° F., a pressure of 45 psig, a nitrogen flow rate of 200 cc/min and a total feed rate of 1.0 $h^{-1}$ LHSV (or 0.24 $h^{-1}$ LHSV for fatty acid). The stearic acid conversion is 82.8% and ketone selectivity is 96.4%. The product was distilled to separate unconverted stearic acid from ketone dimer and an ASTM D-2887 simulated distillation of the dimer is given in Table 1.

TABLE 1

Simulation Distillation of $C_{35}$ Ketone Dimer

| Wt. % | Temperature, ° F. |
|---|---|
| IBP | 863 |
| 10 | 931 |
| 30 | 933 |
| 50 | 935 |
| 70 | 936 |
| 90 | 937 |
| EP | 1172 |

This dimer was blended at the 15 wt. % level into a petroleum vacuum distillate with the properties presented in Table 2.

TABLE 2

Blend Properties

| | |
|---|---|
| N, ppm | 862 |
| S, wt % | 2.02 |
| Viscosity, 100° C./70° C., cSt | 6.527/14.79 |
| Sim Dist, wt %, ° F. | |
| ST/5 | 653/714 |
| 10/30 | 736/781 |
| 50 | 814 |
| 70/90 | 847/894 |
| 95/EP | 915/951 |

The blend was then hydrocracked over a Ni—Mo on silica-alumina hydrocracking catalyst at 0.5 LHSV, 1900 psig total pressure, and a temperature to give a 40 wt. % conversion of 700 F+ material in the feed to 700 F−. It was compared against a run at the same conditions and catalyst, but without dimer added to the vacuum distillate. Surprisingly, the feed with the 15% dimer gave a much higher viscosity index (see Table 3) in the 700 F+ fraction at the same conversion.

TABLE 3

Hydrocracking under light Neutral Hydrocracker Conditions

| | Vacuum Distillate | Vacuum Distillate + 15% Dimer |
|---|---|---|
| Cat Temp, ° F. | 705 | 712 |
| Conv < 700° F., Wt % | 39.9 | 40.1 |
| No Loss Yields, wt % | | |
| C5-180° F. | 1.73 | 2.8 |
| 180-700° F. | 39.86 | 37.19 |
| 700° F.+ | 57.75 | 59.48 |
| C5+ | 99.34 | 99.46 |
| VI | 122 | 150 |
| Vis, 100° C., cSt | 4.869 | 4.979 |
| Sim. Dist., ° F., wt % | | |
| 10/50/90 | 720/790/878 | 724/817/912 |

All patents, patent applications and publications are herein incorporated by reference to the same extent as if each individual patent, patent application or publication was specifically and individually indicated to be incorporated by reference.

The present invention if not to be limited in scope by the specific embodiments described herein, which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the appended claims.

What is claimed is:

1. A process for increasing the viscosity index of a base oil, comprising:
   a) providing a ketone or a beta-keto-ester feedstock from a reaction in a decarboxylation-coupling zone with one or more reactants comprising:
      i. one or more fatty acids which can be the same or different and a decarboxylation-coupling catalyst, or
      ii. one or more esters of fatty acids which can be the same or different and a base;
   b) providing a blend by co-feeding the ketone or the beta-keto-ester feedstock of Step a) with a lubricant oil feedstock together or separately into a hydrocracking zone;
   c) hydrocracking the blend of Step b) in a lubricant hydrocracking zone in the presence of a hydrocracking catalyst and hydrogen under lubricant hydrocracking conditions to produce a hydrocracked stream; and
   d) dewaxing at least a portion of the hydrocracked stream in a hydroisomerization zone in the presence of a hydroisomerization catalyst and hydrogen under hydroisomerization conditions to produce a base oil;
   wherein the ketone feedstock is aliphatic having from 20 to 48 carbon atoms and combinations thereof and the beta-keto-ester feedstock is aliphatic having from 20 to 60 carbon atoms and combinations thereof; and
   wherein the base oil of Step d) comprises a range from about 5 to 40 wt. % of the ketone or the beta-keto-ester feedstock based on the total weight of the base oil.

2. The process of claim 1, further comprising distilling the hydrocracked stream of Step c) to separate at least hydrogen, carbon dioxide, and water, from the stream and collecting at least a portion of the distilled stream for use as a middle distillate fuel.

3. The process of claim 1, further comprising recycling unreacted fatty acids and esters of fatty acids by distilling the ketone or the beta-keto-ester feedstock of Step a) in a distillation zone and feeding unreacted fatty acids or esters of fatty acids back to the coupling zone.

4. The process of claim 2, further comprising separating the portion of the distilled stream into a gasoline boiling point range component, an aviation boiling point range component, and a diesel boiling point range component.

5. The process of claim 1, wherein the fatty acid is selected from caproic acid, caprylic acid, capric acid, lauric acid, myristic acid, palmitic acid, stearic acid, arachidic acid, palmitolic acid, oleic acid, palm kernel oil acids, palm oil acids, coconut oil acids, soy bean oil acids, rape seed oil fatty acids, poultry fat derived fatty acids, beef tallow derived fatty acids and combinations thereof.

6. The process of claim 1, wherein the lubricant oil feedstock is a vacuum gas oil.

7. The process of claim 1, wherein the base oil of Step d) has a kinematic viscosity at 100° C. in a range from about 3 to 7 mm$^2$/s.

8. The process of claim 1, wherein the base oil of Step d) has a viscosity index greater than at least 110.

9. The process of claim 1, wherein the base oil of Step d) is a Group II+ or a Group III base oil.

10. The process of claim 1, further comprising stabilizing the base oil of Step d) in a hydrofinishing zone in the presence of a hydrofinishing catalyst and hydrogen under hydrofinishing conditions.

11. The process of claim 1, wherein the fatty acids or esters of fatty acids are derived from biomass.

12. The process of claim 1, further comprises blending the base oil of Step d) with one or more additives to make a finished lubricant.

13. The process of claim 1, further comprises blending the base oil of Step d) with an engine oil, a grease, a heavy duty motor oil, a passenger car motor oil, a transmission and torque fluid, a natural gas engine oil, a marine lubricant, a railroad lubricant, an aviation lubricant, a food processing lubricant, a paper product, a forest product, a metalworking fluid, a gear lubricant, a compressor lubricant, a turbine oil, a hydraulic oil, a heat transfer oil, or a barrier fluid.

14. The process of claim 1, further comprises blending the base oil of Step d) with an engine oil to obtain a blended oil.

15. The process of claim 14, wherein the engine oil is selected from the group consisting of 5W-20, 5W-30, 5W-40, 5W-50, 5W-60, 10W-20, 10W-30, 10W-40, 10W-50, 10W-60, 15W-20, 15W-30, 15W-40, 15W-50, and 15W-60.

* * * * *

UNITED STATES PATENT AND TRADEMARK OFFICE
CERTIFICATE OF CORRECTION

| | | |
|---|---|---|
| PATENT NO. | : 8,927,796 B2 | Page 1 of 1 |
| APPLICATION NO. | : 13/615054 | |
| DATED | : January 6, 2015 | |
| INVENTOR(S) | : Stephen Joseph Miller et al. | |

It is certified that error appears in the above-identified patent and that said Letters Patent is hereby corrected as shown below:

On the title page the first name of the first inventor is incorrectly spelled "Stephan" and should be corrected as follows --Stephen--.

Signed and Sealed this
Nineteenth Day of May, 2015

Michelle K. Lee
*Director of the United States Patent and Trademark Office*